United States Patent [19]

Ishigaki

[11] Patent Number: 4,717,116
[45] Date of Patent: Jan. 5, 1988

[54] PILOT MODE TWO-PORT SOLENOID VALVE

[75] Inventor: Tsuneo Ishigaki, Soka, Japan

[73] Assignee: SMC Corporation, Tokyo, Japan

[21] Appl. No.: 896,963

[22] Filed: Aug. 15, 1986

[30] Foreign Application Priority Data

Aug. 15, 1985 [JP] Japan .................................. 60-179918

[51] Int. Cl.$^4$ ............................................ F16K 31/40
[52] U.S. Cl. ............................ 251/30.02; 251/30.03; 251/45
[58] Field of Search ...................... 251/30.02.30.03, 45, 251/129.19

[56] References Cited

U.S. PATENT DOCUMENTS

| 3,208,716 | 9/1965 | Rolfe | 251/30.03 |
| 3,677,298 | 7/1972 | Greenwood et al. | 137/625.64 |
| 3,994,318 | 11/1976 | Ishigaki | 251/30.03 X |
| 4,082,116 | 4/1978 | Stampfli | 251/30.03 X |
| 4,295,631 | 10/1981 | Allen | 251/30.03 |
| 4,409,580 | 10/1983 | Ishigaki | 335/278 X |

FOREIGN PATENT DOCUMENTS

| 0051517 | 10/1981 | European Pat. Off. . |
| 2820911 | 9/1984 | Fed. Rep. of Germany . |
| 595572 | 3/1978 | U.S.S.R. | 251/30.03 |
| 974007 | 11/1982 | U.S.S.R. | 251/30.03 |

Primary Examiner—Gerald A. Michalsky
Attorney, Agent, or Firm—Oblon, Fisher, Spivak, McClelland & Maier

[57] ABSTRACT

A two-port solenoid valve of the pilot-assisted type that is designed to function even when there is no pressure difference between the primary and secondary control passages. A pilot valve actuated by the armature of a solenoid opens and closes a pilot discharge passage, with the armature being also adapted to open the main valve that is connected thereto by means of a lifting spring. The pilot discharge passage immovably provided in the valve housing is intended for suppressing the vibration of the main valve in closing. The pilot valve thart comes in and out of contact with the pilot valve seat at one end of the pilot discharge passage is spring-thrusted in the closing direction and attached to the armature. An inwardly projecting hitching rim is provided at the bottom of the armature that is adapted to stop the pilot valve toward the end of the attraction stroke in which the armature is pulled toward the stationary core, thereby ensuring that the pilot valve is released while a large drawing force is secured in the final stage of the attraction stroke.

4 Claims, 8 Drawing Figures

PILOT MODE TWO-PORT SOLENOID VALVE

FIELD OF THE INVENTION

This invention relates to a pilot mode two-port solenoid valve, and more particularly to a pilot mode two-port solenoid valve that is designed to function even when there is approximately no pressure difference between the primary and secondary control passages.

DESCRIPTION OF THE PRIOR ART

There have been various pilot mode two-port solenoid valves adapted to function even where there is approximately no difference between the primary and secondary control pressures, such as the one, for instance, designed by the inventor as disclosed in U.S. Pat. No. 3,994,318. In the two-port solenoid valve according to U.S. Pat. No. 3,994,318, a pilot discharge passage that brings a pressure chamber at the back of the main valve into communication with a secondary control passage is provided above the main valve that comes in and out of contact with the main valve seat, thereby opening and closing the main passage. A pilot valve to open and close the pilot discharge passage is attached to the armature of a solenoid. After the pilot valve has been opened through a spring by the motion of the armature, the main valve that is connected to the armature through the same spring is opened.

When there is little pressure difference between the primary and secondary control passages even when the pilot valve is opened by the armature, the main valve adapted to be actuated by the pressure difference in the pressure chamber sometimes will not open. On such occasions, there arises the need to open the main valve with the aid of the armature or other appropriate means. To meet such need, the armature and the main valve are connected so that the former can exert its force on the latter. A pilot discharge passage is provided above the main valve so that the armature opens the main valve after it has opened the pilot discharge passage. Such structure is very effective in simplifying the design of a pilot mode valve that functions even when there is little pressure difference.

A solenoid valve of the above type, however, is not without a problem in that the main valve causes vibration as it repeatedly comes in and out of contact with the main valve seat in closing and opening, with a resulting shortening of the life of the main valve.

When the current supply to the solenoid is switched off for valve closing, the pilot valve on the armature first closes the pilot discharge passage, thereby admitting the primary pressure into the pressure chamber behind the main valve to thrust the main valve in the closing direction. At this time, however, the main valve and pilot valve do not always close while keeping the pilot discharge passage closed. The two valves sometimes move individually. For example, the main valve opens prior to the pilot valve when an impulsive returning force of the armature and/or a fluid pressure built up in the pressure chamber works thereon. In such instances, the pilot discharge passage opens to allow the fluid in the pressure chamber to flow to the secondary control passage, whereupon the main valve moves in the opening direction. Then, the resulting closure of the pilot discharge passage causes the main valve to move in the closing direction. Repetition of this cycle leads to the generation of vibration. When the number of cycles of the generated vibration is close to the natural frequency of an oscillating system comprising the armature, supporting spring and the like, resonance can occur.

SUMMARY OF THE INVENTION

In a pilot mode two-port solenoid valve having the main valve connected to the armature by means of a spring or other appropriate means and the pilot valve adapted to be opened by a large drawing force toward the end of the attraction stroke in which the armature is attracted toward the stationary core, this invention solves the problem of vibration of the main valve by providing the pilot valve seat not in a movable portion such as the main valve but in a stationary portion of the valve housing.

A primary object of this invention is to provide a structure adapted to prevent the vibration that occurs when the main valve closes, as mentioned previously, in a pilot mode two-port solenoid valve that is designed so that the main valve can be actuated even when there is no pressure difference between the primary and secondary control passages and the pilot valve is opened by a large drawing force toward the end of the attraction stroke of the armature.

Another object of this invention is to provide a pilot mode two-port solenoid valve that permits a reduction in the size and cost of the solenoid employed therein through the making such provisions that the pilot valve is opened by a large drawing force toward the end of the attraction stroke of the armature.

In the proposed pilot mode two-port solenoid valve, the pilot valve is attached to the armature through a spring. Since the opening operation of the pilot valve depends on the force of the spring, it is necessary to set the stiffness of the spring at an appropriate level with the drawing force of the armature and the pressure difference between the primary and secondary control passages in mind.

Still another object of this invention is to provide a pilot mode two-port solenoid valve that eliminates the need for setting the stiffness of the spring at an appropriate level by causing the pilot valve to be moved directly by the armature toward the end of the attraction stroke thereof.

Yet another object of this invention is to provide a pilot mode two-port solenoid valve having the above function in the simplest and easiest-to-make possible design.

A pilot mode two-port solenoid valve according to this invention comprises a valve seat, with which a main valve comes in and out of contact, provided between an inlet port and an outlet port opened in the valve housing. A pressure chamber, which is brought into communication with the inlet and outlet ports through a pilot supply hole and a pilot discharge passage, is provided at the back of the main valve. While a pilot valve actuated by the armature of a solenoid opens and closes the pilot discharge passage, provision is made so that the main valve connected to the armature through a lifting spring comes in and out of contact with the valve seat. The pilot mode two-port solenoid valve of this invention just described achieves the aforementioned objects by introducing such improvements that the pilot discharge passage is immovably provided in the valve housing, the pilot valve which comes in and out of contact with a pilot valve seat at one end of the pilot discharge passage is attached to the armature while being spring-urged in the closing direction, and an inwardly projecting hitching rim is provided at the bottom of the armature so that the pilot valve is caught toward the end of the attraction stroke in which the armature is attracted toward the stationary core of the solenoid.

When the stationary core of this solenoid valve pulls upward the armature as the magnet coil is energized, the drawing force works through the lifting spring to open the main valve when there is substantially no pressure difference between the primary and secondary control passages. When there exists some pressure difference, on the other hand, the armature is attracted toward the stationary core against the urging force of the lifting spring. Then, the hitching projection at the bottom of the armature comes in contact with and raises the pilot valve when the force drawing increases toward the end of the attraction stroke, thereby opening the pilot discharge passage. When the pilot discharge passage is thus opened, the fluid flows from the pressure chamber through the pilot discharge passage to the outlet port, entailing a drop in pressure in the pressure chamber. Consequently, the main valve is opened by the pressure of the fluid from the inlet port.

When the power supply to the magnet coil is switched off, the armature returns to the original position, with the pilot valve closing the pilot valve seat with the urging force of the spring. Consequently, the fluid pressure in the pressure chamber increases, thereby causing the main valve to close the valve seat. Since the pilot valve seat is positioned in the stationary part of the valve housing, the pilot valve seat is not repeatedly opened and closed when the valve seat is closed. As such, the main valve does not undergo vibration.

Other features of this invention will become apparent from the following description of preferred embodiments.

BRIEF DESCRIPTION OF THE DRAWINGS

FIG. 2-B is a plan view of a support in the same embodiment.

FIG. 5-A shows the relationship with the first embodiment of this invention, FIG. 5-B the relationship with a conventional two-port solenoid valve, and FIG. 5-C the relationships with the second and third embodiments of this invention.

DESCRIPTION OF THE PREFERRED EMBODIMENTS

Figure 1:
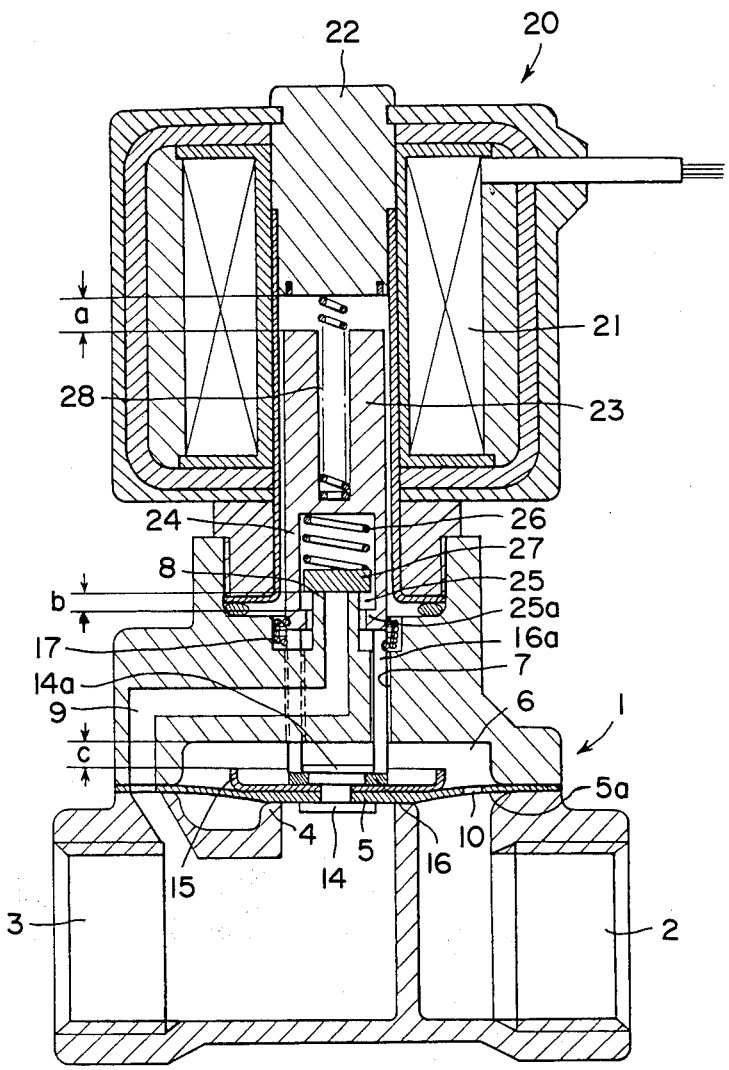
FIG. 1 is a cross-sectional front view of a first preferred embodiment of this invention.

FIG. 1 shows a first preferred embodiment of this invention. A valve housing 1 has an inlet port 2, an outlet port 3, and a valve seat 4 which consists of an opening provided in a passage between the two ports. A main valve 5 positioned opposite the valve seat 4 is supported in the valve housing 1 by a diaphragm 5a that is integral therewith. A pressure chamber 6 is provided thereabove.

The pressure chamber 6 extends to a point where a pilot valve seat 8 opens, through a passage (not shown) appropriately provided in the valve housing 1 or through-holes 7 in which the legs 16a ... of a support 16 to be described later are passed or the like. The pilot valve seat 8 is in communication with the outlet port 3 through a pilot discharge passage 9. The diaphragm 5a has a pilot supply hole 10 that is smaller in diameter than the pilot discharge passage 9, through which the pressure chamber 6 communicates with the inlet port 2.

On top of the valve housing 1 is mounted a solenoid 20 which comprises a stationary core 22 that attracts a movable core known as an armature 23 when current is supplied to a magnet coil 21. The armature 23 in the solenoid has a closed-end bore 24 that extends toward the main valve 5 and forms a pilot valve chamber 25 in which a pilot valve 27 urged by a traveling spring 26 in the direction to close the pilot valve seat 8 is slidably inserted. Along the periphery of the open end of the pilot valve chamber 25 is provided an internally projecting hitching rim 25a that catches the pilot valve 27 to prevent the escape thereof. The pilot valve seat 8 into which the pilot discharge passage 9 in the valve housing 1 opens is positioned opposite the pilot valve 27.

Figure 2A:
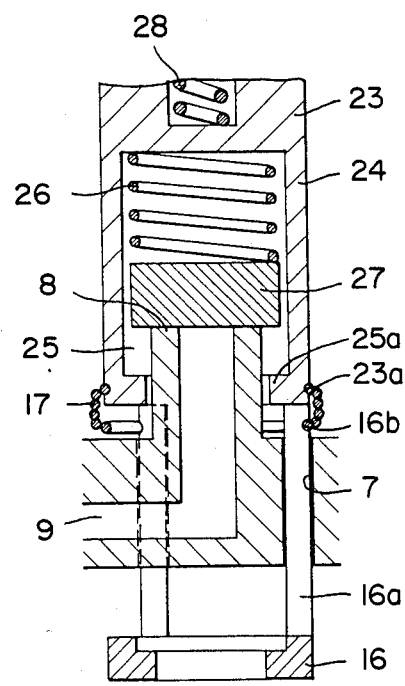
FIG. 2-A is a partially cross-sectional view showing the principal part of the same embodiment.
Figure 2B:
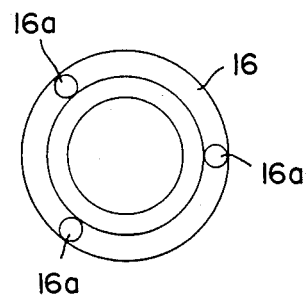

A support 16 having a plurality of legs 16a ... is interposed between the lower end of the armature 23 and a backup plate 15 fastened on the diaphragm 5a with a fastener 14, as is elaborated in FIGS. 2-A and 2-B. The support 16 is placed on top of the backup plate 15, with the bottom end thereof engaged with a holding step 14a provided on the fastener 14 and the legs 16a loosely passed through through-holes 7 in the valve housing 1 and brought in contact with the lower end of the armature 23. A holding groove 16b is cut along the periphery of the upper end of the legs 16a. Both ends of a lifting spring 17 are fitted in the holding groove 16b and another holding groove 23a cut along the periphery of the lower end of the armature 23.

The hitching rim 25a formed along the periphery of the open end of the pilot valve chamber 25 to catch the pilot valve 27 is provided in such a place as to come in contact with the pilot valve 27 in the final stage of the attraction stroke in which the armature 23 is drawn to the stationary core 22. Accordingly, a space corresponding to the amount of travel "b", which is approximately equivalent to the stroke "c" of the main valve, is left between the pilot valve 27 and the hitching rim 25a when the armature 23 is urged toward the main valve 5 by a return spring 28 interposed between the armature 23 and the stationary core 22. The stroke "c" of the main valve is equivalent to the space between the backup plate 15 attached to the diaphragm 5a and the inner wall of the pressure chamber 6, whereas the amount of travel "b" is smaller than the drawing stroke "a" of the armature 23 by the opening stroke of the pilot valve 27.

Next, the operation of the first preferred embodiment will be described as follows.

FIG. 1 shows a state in which the magnet coil 21 is de-energized. The fluid under pressure from the inlet port 2 is supplied through the pilot supply hole 10 in the diaphragm 5a to the pressure chamber 6. Urged by the traveling spring 26, the pilot valve 27 closes the pilot valve seat 8, as a result of which the pressure in the pressure chamber 6 rises to cause the main valve 5 to close the valve seat 4.

When current is supplied to the magnet coil 21 under this condition, the stationary core 22 draws the armature 23 against the force of the return spring 28. Consequently, the armature 23 is drawn toward the stationary core 22 while stretching the lifting spring 17.

When the pressure difference between the primary and secondary control passages is small and the force exerted by the lifting spring 17 on the main valve is larger than the valve-closing force exerted by the fluid in the pressure chamber 6, the lifting spring 17 pulls up the main valve 5 to open the valve seat 4.

When the pressure difference between the primary and secondary control passages is too large to allow the urging force of the lifting spring 17 to directly open the main valve 5, the hitching rim 25a at the bottom of the armature 23 comes in contact with the pilot valve 27 when the armature 23 is drawn by the stationary core 22 over a distance "b". The subsequent motion of the armature 23 causes the pilot valve 27 to open the pilot valve seat 8, whereupon the fluid flows from the pressure chamber 6 through the pilot discharge passage 9 to the outlet port 3, thereby lowering the pressure in the pressure chamber 6. Accordingly, the pressure of the fluid in the primary control passage working on the under side of the diaphragm and the urging force of the stretched lifting spring 17 cause the main valve 5 to open the valve seat 4.

Figure 5A:
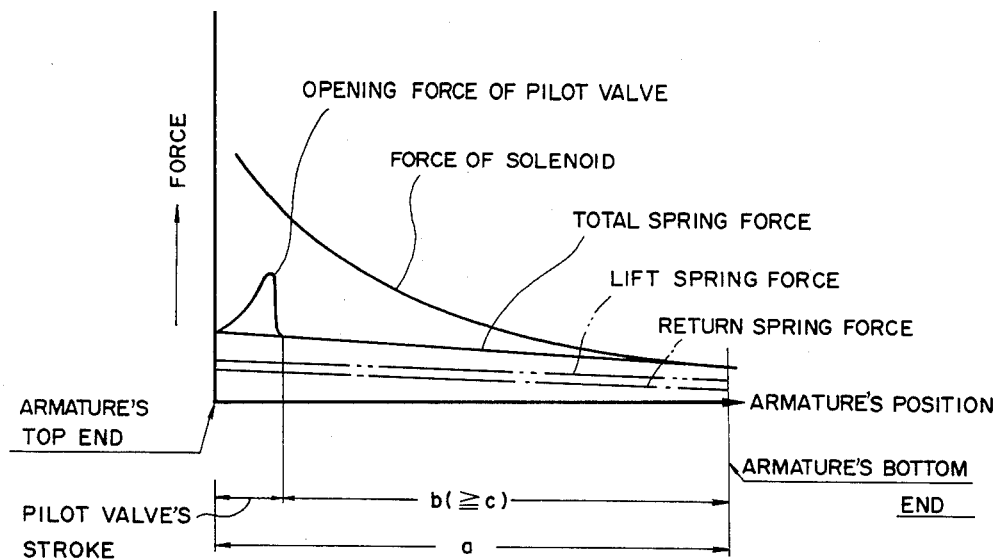
FIGS. 5-A to 5-C are graphical representations of the relationship between the stroke and drawing force of the armature of a solenoid.
Figure 5B:
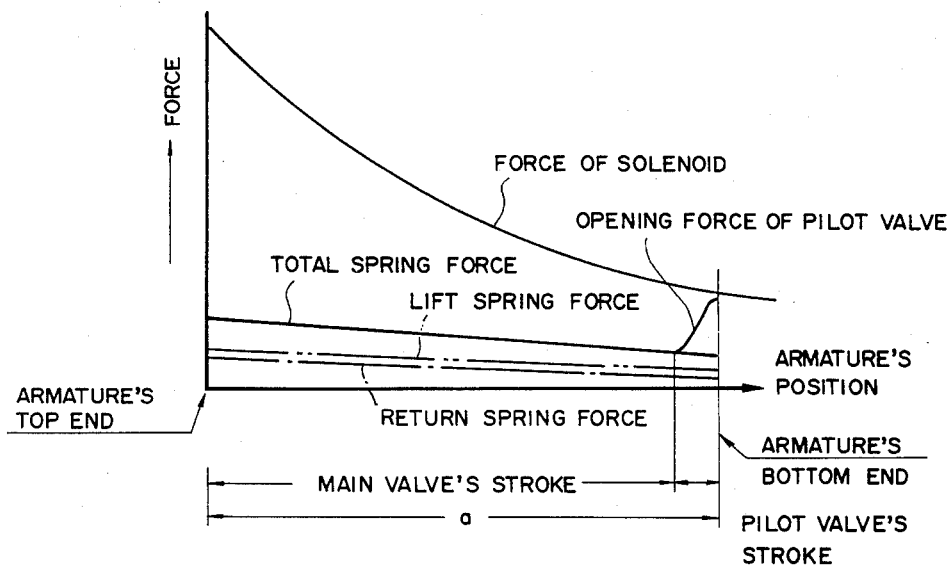
Figure 5C:
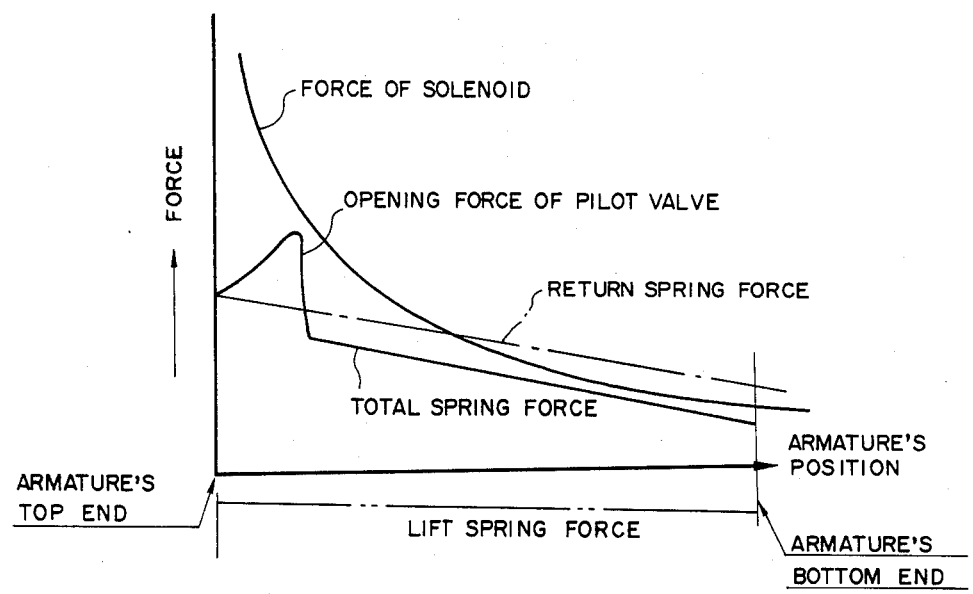

FIG. 5-A shows the relationships between the stroke of the armature 23 and the magnetic drawing force and between the force working on the pilot valve and the forces of the springs. As is obvious, the pilot valve 27 opens the pilot valve seat 8 when the drawing force has become large enough toward the end of the attraction stroke of the armature 23. In a conventional pilot solenoid valve shown in FIG. 5-B, by contrast, the pilot valve is opened in the initial stage of the attraction stroke when the drawing force of the stationary core is still small. This difference permits reducing the drawing force of the magnet coil 21 and, therefore, the size of the solenoid 20.

With a conventional solenoid valve, as is shown in FIG. 5-B, the pilot valve, which constitutes the maximum load, is opened in the initial stage of the attraction stroke of the armature when the drawing force of the stationary core is not yet fully developed. In other words, the solenoid in such a conventional valve must be large enough to exert the required large drawing force even in such an early stage of the stroke. Meanwhile, the two-port solenoid valve of this invention just described is designed to take advantage of the large enough magnetic drawing force that is developed in the final stage of the attraction stroke of the armature 23. Therefore, even such a small solenoid can serve the purpose whose drawing force is just enough to overcome the composite force exerted by the lifting spring 17 and the return spring 28 at the end of the return stroke (at the right end of the stroke shown in FIG. 5-A) of the armature 23.

When the magnet coil 21 is de-energized, the armature 23 is brought back to the closing position by the force of the return spring 28, whereupon the pilot valve seat 8 is closed by the pilot valve 27. Then, as the fluid under pressure flows into the pressure chamber 6 through the pilot supply hole 10, pressure builds up in the pressure chamber 6, actuating the main valve 5 to close the valve seat 4. In this case, the main valve 5 can close the valve seat 4 with the aid of the urging force of the return spring 28 even when the fluid pressure in the pressure chamber 6 is low. Accordingly, the valve-closing operation is surely accomplished even if the pressure difference between the inlet port 2 and the outlet port 3 is small. Since, furthermore, the pilot valve seat 8 closed by the pilot valve 27 is immovably provided in the valve housing, the pilot valve is not repeatedly opened and closed, thereby dispensing with the vibration that might otherwise result from the closing of the main valve.

Figure 3:
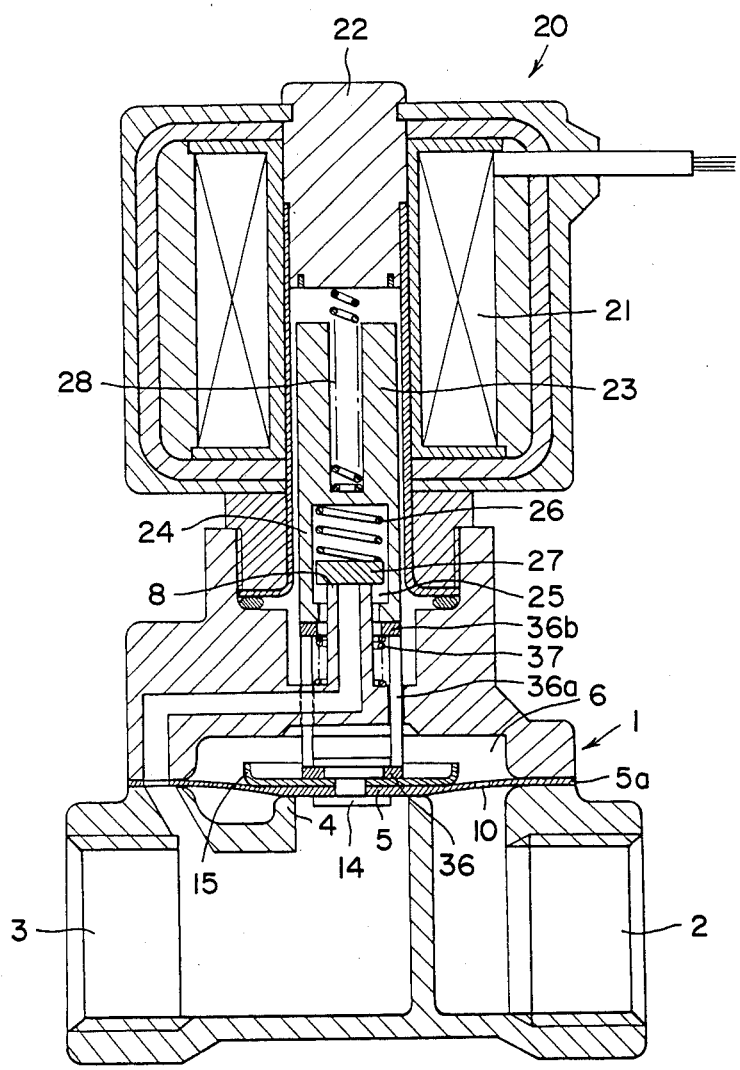
FIG. 3 is a cross-sectional front view of a second preferred embodiment.

FIG. 3 shows a second preferred embodiment of this invention, in which the lifting spring 17 interposed between the armature and support to exert a tension in the first embodiment is supplanted by a compressed lifting spring 37 interposed between the valve housing 1 and holding projections 36b formed at the top end of the legs 36a extending from a support 36.

The force of the return spring 28 must be strong enough to return the armature 23 to the original position against the force of the lifting spring 37. Arrangement of other components being equal to that in the first preferred embodiment, the same or analogous parts are denoted by similar reference characters, dispensing with detailed description.

Figure 4:
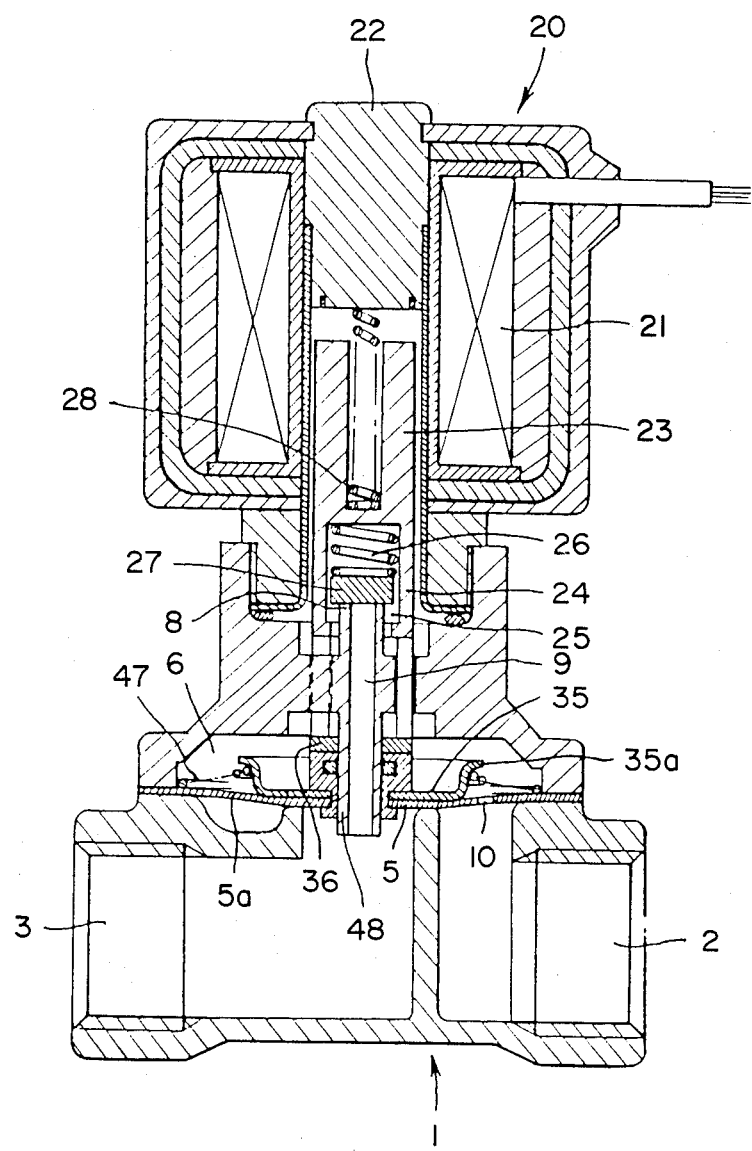
FIG. 4 is a cross-sectional front view of a third preferred embodiment.

FIG. 4 shows a third preferred embodiment of this invention, in which the lifting springs 17 and 37 provided in the above two embodiments to exert force on the support is replaced by a lifting spring 47 that is interposed between a holding projection 35a formed by outwardly bending the periphery of a backup plate 35 and the periphery of the diaphragm 5a in the valve housing 1 to urge the main valve 5 in the opening direction.

Also, the pilot discharge passage 9 leading from the pilot valve seat 8 to the outlet port 3 is provided in a guide tube 48 passing through the center of the main valve which is slidable with respect to the guide tube 48 and adapted to be guided thereby.

Arrangement of other components being equal to that of the second preferred embodiment, the same or analogous parts are represented by similar reference characters.

Description of the second and third preferred embodiments is omitted since they operate just like the first preferred embodiment except that the urging force of the lifting springs 37 and 47 work against the force of the return spring 28 as shown in FIG. 5-C.

While some preferred embodiments of the invention have been shown and described, it should not be limited thereto but can be embodied in various ways without departing from its spirit and scope.

What is claimed is:

1. In a pilot mode two-port solenoid valve comprising a valve housing, a valve seat to which a main valve comes in and out of contact positioned in a passage between an inlet port and an outlet port provided in said valve housing, a pressure chamber at the back of the main valve, the pressure chamber being brought into communication with the inlet and outlet ports through a pilot supply hole and a pilot discharge passage, a pilot valve actuated by the armature of a solenoid to open and close the pilot discharge passage and thereby bring the main valve in and out of contact with the valve seat, the main valve being connected to the armature by means of a lifting spring, the improvement that the pilot discharge passage is immovably provided in the valve housing, the pilot valve coming in and out of contact with a pilot valve seat at one end of the pilot discharge passage is attached to the armature while being spring-urged in the closing direction, and a holding rim is provided to the armature so that the pilot valve is caught thereby toward the end of the attraction stroke in which the armature is drawn to the stationary core.

2. The improvement as set forth in claim 1, in which a support having a plurality of legs whose free ends are adapted to contact the armature is attached to the main valve, the sliding motion thereof being guided by the valve housing, and a lifting spring to urge the main valve through the support toward the armature is provided.

3. The improvement as set forth in claim 2, in which the legs extending from the support on the main valve are connected to the armature by means of a lifting spring.

4. The improvement as set forth in claim 2, in which holding rims are provided at the free end of the legs extending from the support on the main valve and a compressed lifting spring to urge the main valve in the opening direction is interposed between the holding rims and the valve housing.

* * * * *